May 29, 1951 G. R. WOOD 2,554,888
HOUSING FOR COFFEE MILLS
Filed April 11, 1946 3 Sheets-Sheet 3
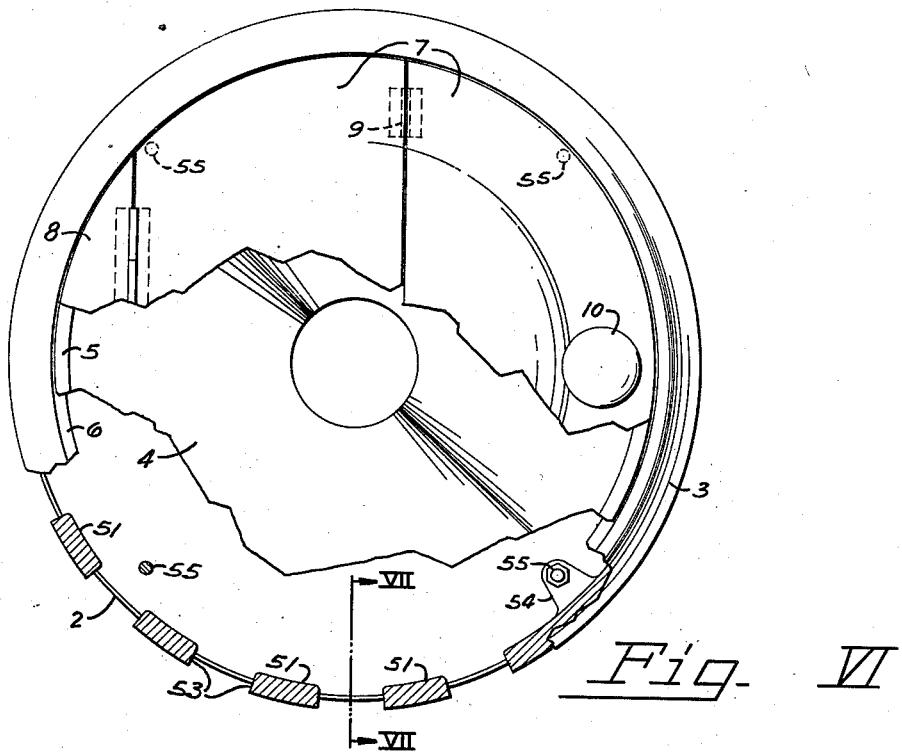
Fig. VI
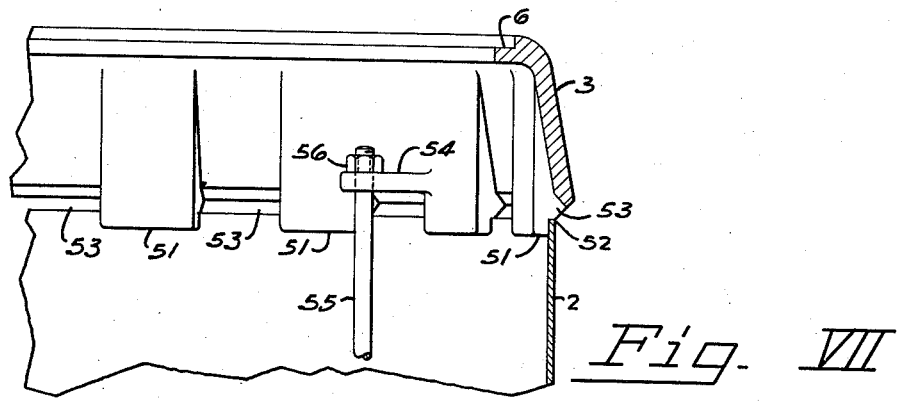
Fig. VII
INVENTOR.
George R. Wood
BY
Marshall & Marshall
ATTORNEYS Patented May 29, 1951

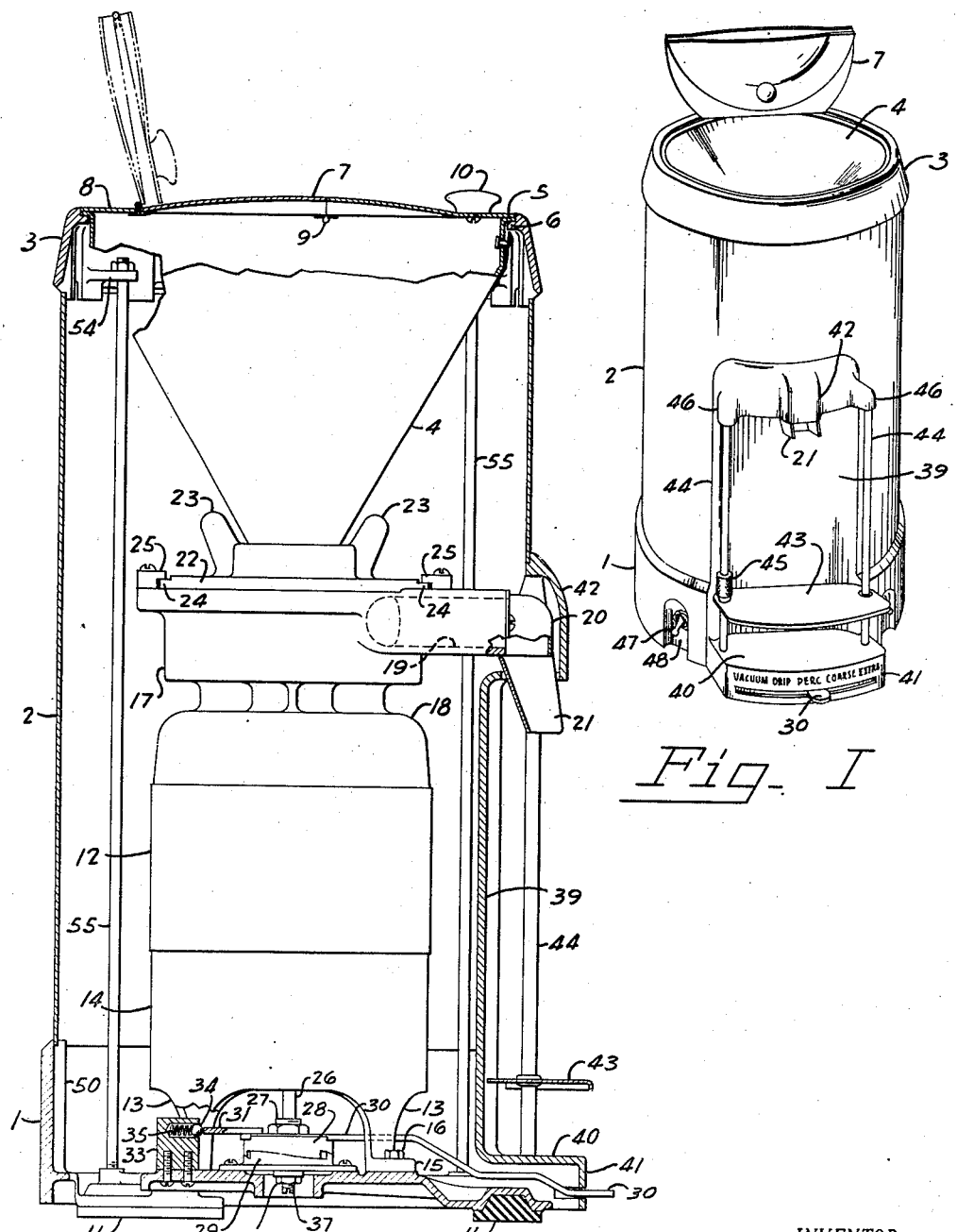

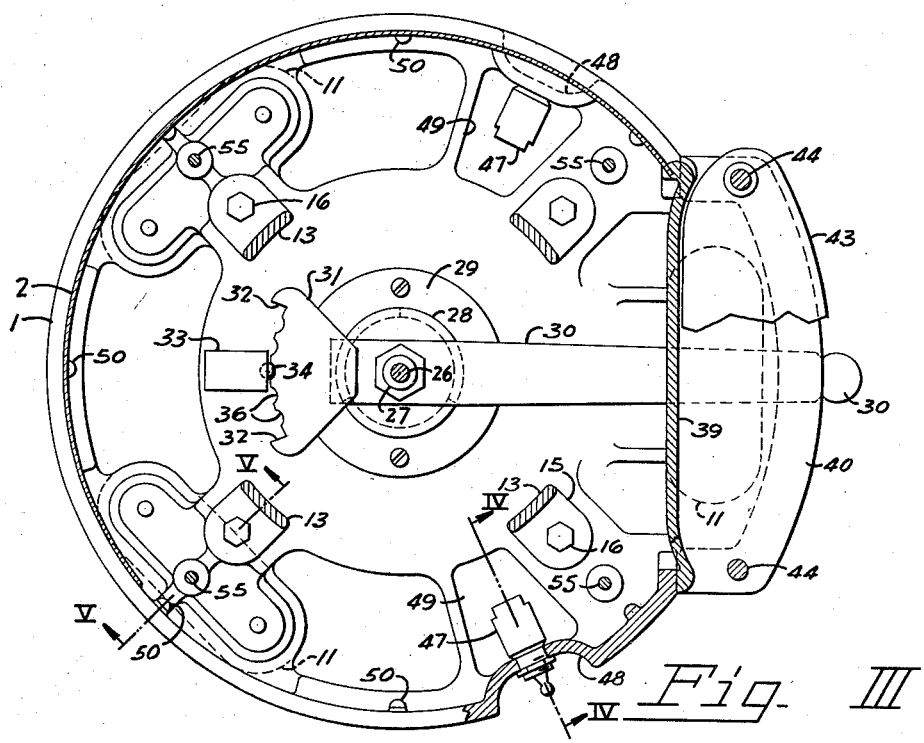
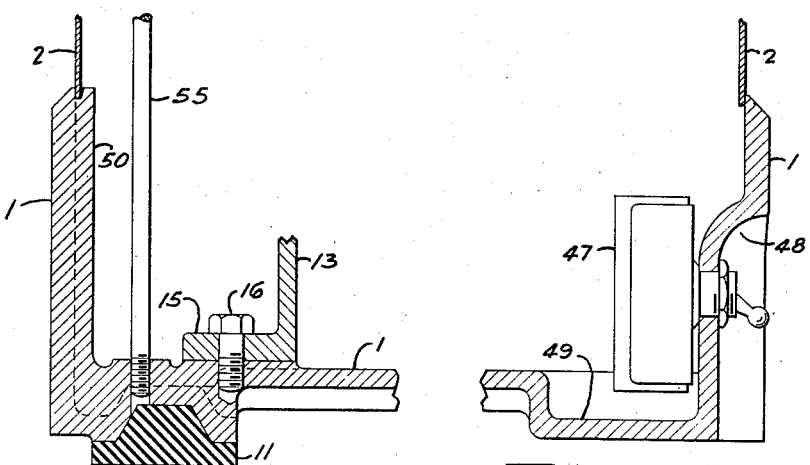

2,554,888

UNITED STATES PATENT OFFICE 2,554,888

HOUSING FOR COFFEE MILLS

George Rue Wood, Toledo, Ohio, assignor to Toledo Scale Company, Toledo, Ohio, a corporation of New Jersey Application April 11, 1946, Serial No. 661,442

2 Claims. (Cl. 241—285)

This invention relates to coffee mills and in particular to an improved housing for a motor driven coffee mill suitable for use in retail stores.

Because of the tendency of ground coffee to grow stale and rancid when it is stored and the much better keeping quality of coffee beans it is common practice to stock coffee beans and then grind them at the time of sale. Many coffee grinders have been built for use in the retail stores, but in general these grinders have been bulky and noisy.

Many of the grinders are enclosed in generally rectangular housings which in order to provide sufficient hopper capacity and a discharge opening high enough to accommodate ordinary coffee bags are quite bulky and top-heavy. Furthermore, all grinding machines, including coffee mills, are subject to vibration when in operation. The flat sides of an ordinary coffee mill housing serves as efficient sound radiators converting much of the vibrational energy into audible noise. The use of a sound absorbing material on the interior surfaces of an ordinary housing, while it may reduce the noise is rather expensive and generally unsatisfactory.

The principal object of this invention is to provide a simple, easily manufactured coffee mill housing.

Another object is to provide a coffee mill housing design which, although employing lightweight materials, is rigid.

A still further object is to provide a coffee mill housing whose shape prevents it from acting as an efficient sound radiator.

More specific objects and advantages are apparent from the following detailed description of a specific coffee mill housing embodying and illustrating the invention.

According to the invention simplicity and quietness are attained by providing a vertically arranged coffee grinder with a generally cylindrical housing whose diameter while slightly greater than that of the grinder motor is only sufficient to accommodate a reasonably sized hopper. The cylindrical form allows the side walls of the housing to be formed by a simple rolling operation which is much simpler than the forming operation required for the sides of a rectangular housing. Further, the curvature of the side walls produces a much more rigid structure for a given thickness of material than a rectangular structure of equal volume. This stiffness alone tends to reduce the amplitude of vibration of the housing surface and thus reduce the noise output of the machine. The curved form has a further advantage in reducing noise because a convex surface tends to radiate sound through a much wider angle than an equivalent flat surface so that the sound intensity at any given point is greatly reduced.

The sound radiation from the improved housing is minimized by separately mounting the driving motor supporting the grinder and the housing from the base in such a manner that direct contact between the grinder or motor and the housing is avoided. Thus, it is necessary for vibrations to travel from the motor through the base and into the housing before they can be radiated as noise from the surface of the housing.

A compact, quietly operating coffee mill embodying the invention is illustrated in the accompanying drawings.

In the drawings:

Figure I is a perspective view of a coffee mill whose housing is constructed according to the invention.

Figure II is a vertical section of the coffee mill housing showing the arrangement of the driving motor, the grinder and the hopper as installed in the housing.

Figure III is a plan view, partly in section, of the base of the housing.

Figure IV is a fragmentary vertical section taken along the line IV—IV of Figure III.

Figure V is a fragmentary vertical section taken along the line V—V of Figure III.

Figure VI is a plan view, with parts broken away and parts shown in section, of the top of the improved coffee mill housing.

Figure VII is a fragmentary vertical section taken substantially along the line VII—VII of Figure VI.

These specific figures and the accompanying description are intended merely to illustrate a preferred embodiment of the invention and not to impose limitations on the claims.

The improved coffee mill housing constructed according to the invention comprises a low, generally cylindrical cast base 1, a cylindrical sheet metal housing portion 2, and a cast hopper supporting ring 3 surmounting the cylindrical section 2. A conical hopper 4 provided with an outwardly extending flange 5 fits into the cast supporting ring 3 with the flange 5 resting on an inwardly directed ledge 6 of the supporting ring 3. A hopper cover 7 is hinged to a segment 8 welded to the top surface of the flange 5. The movable part of the cover 7 is divided into two parts joined by hinges 9 so that it may be folded double when it is opened. A knob 10 serves as a handle to facilitate opening the cover.

The base 1 is of generally open-ribbed construction and is provided with rubber feet 11 adapted to resiliently support it from a counter or other surface on which it may be placed. A motor 12 designed to operate with its shaft vertical has legs 13 extending axially from its lower end frame 14. The legs 13 terminate in feet 15 which by means of bolts 16 are secured to the base 1.

A grinding or burr chamber 17 is formed integrally with the top end frame 18 of the motor 12. Ground coffee is discharged from the grinding chamber 17 along a passage 19 terminating in an elbow 20 positioned directly above a chute 21. The top of the grinding chamber 17 is closed by an apertured cover 22 having a pair of upstanding wings 23 similar to the wings of a wing nut so that the cover 22 may be easily rotated with respect to the chamber 17. When the cover is rotated a pair of lugs 24 extending radially from the cover catch under hook-like stops 25 to securely lock the cover in place. The aperture in the top of the cover 22 between the wings 23 is funnel shaped to receive the lower end of the hopper 4 so that material in the hopper is directed into the center of the grinding chamber 17. A pair of grinding burrs are located in the chamber 17 with the upper one of the burrs rigidly attached to the cover 22 while the other of the burrs is keyed to the shaft of the motor 12 and is axially slidable thereon. The latter burr may also be equipped with vanes around its periphery to force the ground coffee through the passage 19.

The lower burr is slidable along the motor shaft so that the spacing between the burrs may be varied to regulate the fineness of the grind. The motor shaft is tubular so that a rod 26 extending axially therethrough may be used to support and position the rotating burr. The lower end of the rod 26 is supported in a socket 27 fastened in the movable member of an adjusting cam 28. A stationary member 29 of the cam 28 is secured to the base 1. The cam is adjusted by a handle 30 secured to and extending forward from the movable member of the cam 28 between two of the legs 13 of the motor 12 and thence out through the front of the base. The handle 30 extends back beyond the cam 28 far enough to support a detent plate 31, the plate 31 having a pair of stops 32 which cooperate with a block 33 screwed to the base 1 to limit the angular travel of the cam 28. A detent ball 34 urged outwardly by a spring 35 is mounted in a blind hole in the block 33 in such position that it may engage any of a series of notches 36 in the detent plate 31 and thus hold the cam 28 in adjusted position.

A screw 37 held in adjusted position by a lock nut 38 extends upwardly into the bottom of the socket 27 in position to support the bottom of the rod 26 thereby allowing initial adjustment of the clearance between the burrs to be easily made. That portion of the cam 28 containing the socket 27 and the screw 37 extends downwardly through a hole in the stationary cam member 29 so as to hold the movable cam member in axial position.

For convenience in handling ground coffee the front of the housing is finished with a one piece casting 39 which at its lower end has an outwardly extending shelf 40 terminating in an apron 41 through which the cam adjusting handle 30 protrudes. The upper end of the casting 39 has a forwardly extending hood-shaped portion 42 which covers the elbow 20 of the discharge passage from the grinding chamber 17. The chute 21 may conveniently be supported in the bottom of the hood 42. The casting 39 presents a cylindrical concave exterior through the major portion of its height which blends with the cylindrical housing 2 to form a shallow recess for coffee bags. By blending the bottom of the cylindrical portion into the shelf 40 in a smooth curve all crevices in which ground coffee may lodge are eliminated and a smooth sanitary surface is insured.

The vertical height from the shelf 40 to the chute 21 is sufficient to accommodate coffee bags having substantially the same capacity as the hopper 4. To accommodate smaller bags an adjustable shelf 43 slidably mounted on rods 44 is provided. The adjustable shelf is clamped in position by a collet 45 which not only serves to clamp the shelf in position but also to keep it parallel with the fixed shelf 40. The rods 44 extending upwardly from the fixed shelf 40 may either be made short so as to accommodate only the required range of adjustment in the height of the shelf 43 or they may be extended upwardly and secured in hood-shaped ears 46 formed in the upper part of the casting 39 on either side of the chute covering hood 42. In the latter case they may serve as side supports for a coffee bag.

The base 1 which is shown in detail in Figure III, has a fair proportion of its area open to provide air circulation for cooling the motor 12. A pair of switches 47 are mounted in the side walls of the base 1, one on either side of the shelf 40. The switches 47 are mounted on the back walls of recesses 48 which are deep enough so that the switch handles are protected from accidental damage. One of the switches 47 is used to control the motor 12, while the other of the switches may be used to control a light placed inside the housing in case a translucent area is provided in the cylindrical side wall 2, which translucent area may be used for advertising matter. A solid cup-like portion 49 of the base 1 immediately beneath each switch acts as a barrier so that it is impossible to reach into the bottom of the assembled housing and contact the switch terminals.

As seen in detail in Figures IV and V, the cylindrical housing 2 fits snugly within the side wall of the base 1. A plurality of ribs 50 formed integrally with the side wall of the base 1 are notched at their tops adjacent the inner surface of the side wall to receive and position the lower end of the cylindrical housing 2 when it is assembled on the base 1.

The hopper retaining ring 3 surmounting the cylindrical side wall 2 of the housing is shown in detail in Figures VI and VII. The ring 3 is made in the form of a casting having a smooth, slightly flared exterior and a crenelated interior. The crenelated portions form a series of downwardly extending lugs 51 having shoulders 52 on their outer edges a short distance from the bottom. When assembled on the cylindrical side wall 2 the downwardly extending lugs 51 fit inside the housing while the shoulders 52 rest on the upper end of the housing. Formed in this manner the ring 3 provides a smooth, simple exterior and yet provides a plurality of air passages 53 so that air heated by the motor may rise around the hopper 4 to the top of the housing and escape through the passages 53. Moreover, the downwardly expanding flare of the smooth exterior portion of the ring 3 terminates in a diameter sufficiently great so as to overhang the side wall 2 and thus prevent the entrance of foreign material into the housing.

A plurality of ears 54 projecting from the inside surface of the ring 3 are drilled to receive the upper ends of elongated studs or rods 55 threaded into the base 1. Nuts 56 threaded on the upper ends of the studs 55 draw the ring 3 down against the top of the housing 2 and by transmitting force through the housing hold it securely against the base 1.

With the exception of the casting 39 fitted into the front of the housing the improved housing consists of only three pieces, two of which are relatively simple castings and the other is a plain sheet metal cylinder. These three parts, the base 1, the cylindrical side wall 2 and the cast hopper retaining ring 3 are held securely in assembled position without any screws or fastening means of any kind visible from the exterior of the machine. The casting 39 forming the concave front of the machine is secured to the base 1 by screws accessible from the bottom of the housing. It is provided with clips such that its upper portion may be engaged with the housing 2 by an upward motion and then the shelf and apron slipped over the handle 30 and the bottom secured in place. Thus the complete assembly is made without the use of any visible fastening means.

The improved housing contributes very materially to the quietness of operation of the coffee mill with which it is used. The separate mounting of the motor and the housing on the base isolates the housing from the major part of the grinder vibration because the vibration must travel through the length of the motor and through the base before it can get to the housing to be radiated as sound. In constructing a housing to take advantage of this vibration isolation it is necessary to make sure that the exit passage, such as the passage 19 through which the ground coffee is discharged, does not touch the housing. In the housing described above the elbow 20 at the end of the discharge passage 19 is positioned directly above and slightly spaced from the chute 21.

Another feature contributing to the quietness of the machine is the lack of any large flat sound radiating surfaces. The cylindrical side wall section tube even though it is made of a thin material is, nevertheless, rigid because of its curvature. Its rigidity is sufficient so that it will not respond to or amplify any vibration transmitted to it and therefore is free from resonance effects as are commonly encountered in rectangularly shaped housings employing flat panels as sides. The improved housing simplifies the manufacture of the coffee mill because of its simplicity as well as improving its appearance and performance.

While the preferred form of the invention is illustrated various modifications may be made without detrimentally affecting its performance. Therefore the specific example disclosed is intended to be merely illustrative of the invention and not a measure of the scope of the invention.

Having described the invention, I claim:

1. In a grinding mill having a vertically mounted motor and a grinding chamber supported by the motor, a housing for the motor and grinding chamber comprising a perforated base forming the sole support of the motor and grinding chamber, the base having a generally circular periphery, a thin-walled generally cylindrical member seated on the circular portion of the base and enclosing but not contacting the motor and grinding chamber, a collar having an inwardly directed crenelated portion engaging the end of the cylindrical member, a plurality of bolts connecting the collar to the base, and a hopper equipped with a cover, the hopper being adapted to rest in the collar with its cover forming a top for the housing.

2. A housing for a grinding mill of the type having a vertically mounted motor, a grinding chamber on the upper end of the motor, a laterally directed discharge spout, and a hopper above the grinding chamber; the housing comprising a generally circular perforated base for mounting the motor, a generally cylindrical side wall mounted on the base and enclosing but not contacting the motor and grinding chamber and extending above the grinding chamber, said side wall having an opening exposing the discharge spout and the space beneath the spout, a concave wall section mounted on the base filling said opening to form a receptacle support, and a ring seated on the side wall and attached to the base to hold the side wall in position, said ring having a rim to receive the hopper.

GEORGE RUE WOOD.

REFERENCES CITED

The following references are of record in the file of this patent:

UNITED STATES PATENTS

| Number | Name | Date |
| --- | --- | --- |
| 312,493 | Milligan | Feb. 17, 1885 |
| 891,659 | Boeck | June 23, 1908 |
| 1,764,700 | Spielman | June 17, 1930 |
| 1,936,526 | Seidel | Nov. 21, 1933 |
| 2,019,013 | Kopf et al. | Oct. 29, 1935 |
| 2,138,204 | Roble | Nov. 29, 1938 |
| 2,217,069 | Meeker | Oct. 8, 1940 |
| 2,229,031 | Anderson | Jan. 21, 1941 |